(12) United States Patent
Trovato

(10) Patent No.: US 6,480,538 B1
(45) Date of Patent: Nov. 12, 2002

(54) LOW BANDWIDTH ENCODING SCHEME FOR VIDEO TRANSMISSION

(75) Inventor: Karen I. Trovato, Putnam Valley, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/111,564

(22) Filed: Jul. 8, 1998

(51) Int. Cl.$^7$ .................................................. H04N 7/12
(52) U.S. Cl. .................................................. 375/240.01
(58) Field of Search ............................ 345/587; 348/26; 375/240.01, 240.03, 240.04, 240.08, 240.12, 240.16, 240.24; 382/217, 236, 232, 266; H04N 7/12

(56) References Cited

U.S. PATENT DOCUMENTS

| | | | | |
|---|---|---|---|---|
| 5,333,012 A | * | 7/1994 | Singhal et al. | 375/240.04 |
| 5,533,140 A | * | 7/1996 | Sirat et al. | 375/240.24 |
| 5,647,024 A | * | 7/1997 | Kawauchi et al. | 382/232 |
| 5,734,386 A | * | 3/1998 | Cosman | 345/587 |
| 5,835,237 A | * | 11/1998 | Ebrahimi | 382/266 |
| 5,978,034 A | * | 11/1999 | Hosaka | 375/240.16 |
| 5,990,957 A | * | 11/1999 | Ryoo | 375/240.03 |
| 6,005,980 A | * | 12/1999 | Eifrig et al. | 382/236 |
| 6,154,570 A | * | 11/2000 | Boon | 382/236 |
| 6,157,745 A | * | 12/2000 | Salembier | 375/240.12 |
| 6,215,905 B1 | * | 4/2001 | Lee et al. | 375/240.08 |
| 6,285,788 B1 | * | 9/2001 | Sezan et al. | 382/217 |
| 6,307,885 B1 | * | 10/2001 | Moon et al. | 375/240.24 |

FOREIGN PATENT DOCUMENTS

| | | | |
|---|---|---|---|
| EP | 0706155 A1 | * | 4/1996 |
| WO | WO 97/09828 | * | 3/1997 |

* cited by examiner

*Primary Examiner*—Richard Lee
(74) *Attorney, Agent, or Firm*—Russell Gross

(57) ABSTRACT

A method and apparatus is disclosed for encoding areas of an image that have definable parameters as graphic objects and then encoding the remaining areas of the image, if any, as a raster scanned image. This method and apparatus is particularly well suited for the encoding of an image that has areas that can be described as having a particular texture characteristic. Each area of the image, and subsequent images, that have the particular texture characteristic is encoded with an identifier to the texture characteristic, rather than encoded with the details of the texture itself. Regular texture pattern types, such as bricks, marble, woodgrain, satin, velour, etc. are associated with areas of the image, and the encoding of these areas merely contain an identification of the pattern type. Areas of the image that do not contain regular texture pattern types are encoded as conventional raster scanned areas of the image. A decoding device processes the conventional raster scanned encoding, then processes the encoding of the textured areas and fills in the details associated with each identified texture pattern type. In a preferred embodiment, the level of detail provided by the decoding device is dependent upon the characteristics of the display device.

12 Claims, 3 Drawing Sheets

LOW BANDWIDTH ENCODING SCHEME FOR VIDEO TRANSMISSION

FIELD OF THE INVENTION

This invention relates generally to the field of video processing, and in particular to the field of compressing, encoding, and decoding video images.

BACKGROUND OF THE INVENTION

Video images are encoded and compressed to reduce the size of the data sets needed to communicate these images. The size of the compressed encoding of an image can affect various aspects of a video system's performance. Storage requirements, bandwidth requirements, and transmission rate requirements are all directly correlated to the size of the encoded image. The size of the compressed encoding can also have an effect on image quality. MPEG, for example, is a lossy encoding: if the encoding exceeds a space or time constraint imposed by an MPEG standard, the encoding is truncated to fit the available space. That is, if an encoding is too complex, in terms of the amount of information that needs to be transferred in the time allowed for the transfer, a loss of quality occurs. Similarly, transmission of images over relatively low bit rate channels requires a reduction in the amount of data to be transferred, which is usually effected by reducing the resolution and quality of the transmitted image.

In general, the size of the compressed encoding of an image is dependent upon the content of the image, and the techniques used to encode the image. Traditionally, the fields of video processing and graphics image processing use different processes and techniques to provide images to potential viewers. Video image processing is primarily raster based. An image is scanned using a predetermined pattern to produce a modulation of a signal, the signal is communicated to a receiver, and the receiver applies the modulation to a display to recreate the image. Various techniques are used to compress the encoding of the raster image to optimize transmission efficiency and speed, including MPEG and other encodings.

Graphics image processing, on the other hand, is primarily object based. An image is composed of a variety of objects, each object occupying a particular area of the graphics image. The objects may correspond directly to actual objects in the image, such as boxes and circles, or may correspond to created objects, such as a multitude of triangular segments of areas of the image having similar characteristics. The graphics encoding of an image includes the identification of the type of object, such as line, circle, triangle, etc., and the location in the image at which the object appears. Also associated with each object are parameters that describe how the object is to be rendered at the specified location, such as the object's color, size, texture, shading, translucency, etc. These parameters may be included in the identification of the type of object (e.g. a red circle), or in the specification of the location of the object in the image (a circle at (x,y), color=red).

In both the graphics and raster compressed encodings, large areas of uniform characteristics are efficiently encoded. A large blue square in an image is encoded in a graphics encoding as a square of a given size having a color of blue located at a given coordinate in the image space. The raster scan of a monochromatic area, such as a large blue square, produces bands of relatively constant modulation; these constant modulations are efficiently compressed during the discrete cosine transformation (DCT) process that is common to compression schemes such as MPEG.

Textured areas, on the other hand, will not necessarily be efficiently encoded by a DCT transformation, because the modulation is not constant. For example, a brick wall that has red bricks and gray mortar between the bricks will produce differing modulations as the raster scan traverses each red area and each gray area during the scanning process. Similarly, a marbled surface, consisting of random streaks of grain of differing colors amongst gray-white clouds of varying intensity will produce a non-uniform modulation pattern. Such areas, however, can be efficiently encoded as graphics objects having particular texture characteristics (e.g. brick wall at (x,y), colors=red, gray). Conversely, images containing somewhat randomly placed objects may be more efficiently encoded as a compressed raster encoding. An outdoor scene, for example, may be efficiently compressed by a DCT transformation, but may not be efficiently encoded as a graphics encoding of each object that forms the image, such as each leaf on a tree in the scene.

Conventional video processing of an image produces an encoding of the image that is independent of the display that may be used to display the image. In general, the image is raster scanned at a predetermined horizontal and vertical frequency and resolution and encoded so as to retain as much image information as possible. This detailed image information is provided to a 3" portable display, or a 36" wall display, regardless of the display's ability to reproduce this information. Within the same display, also, the same detailed image information is processed regardless of whether the image is displayed on the full screen, or a portion of the screen, such as a picture-in-picture window. In addition to the inherent inefficiency of this information transfer, the conversion of high resolution image information for display on a lower resolution display, or a small area of a high resolution display, also requires the use of anti-aliasing filtering techniques to remove the excess information prior to display. In the red brick wall with gray mortar example above, a low resolution display with appropriate anti-aliasing will display the wall as a uniform area of an off-red color. Attempting to display the details of the gray mortar, without anti-aliasing, will typically result in a display of a red wall with arbitrary gray moire patterns.

Thus it is seen that neither conventional video processing nor conventional image processing provides superior performance and efficiency compared to the other under all circumstances. It is also seen that conventional video processing does not provide for an encoding scheme that is optimal for differing display devices.

Therefore, a need exists for an encoding technique that provides the advantages of both video processing and image processing. In particular, a need exists for an image encoding technique that allows for a minimal sized encoding of an image, without the loss of quality or resolution that conventionally occurs when video encodings are reduced in size. A need also exists for an image encoding technique that allows for a decoding process that is dependent upon the characteristics of the display that is used to render the decoded image.

DETAILED DESCRIPTION OF THE PREFERRED EMBODIMENT

In General, the invention provides for a method and apparatus for encoding an image by encoding areas of the image that have definable parameters and then encoding the remaining areas of the image. The invention is particularly well suited for the encoding of an image that has areas that can be described as having a particular texture characteristic. Each area of the image, and subsequent images, that have the particular texture characteristic is encoded with an identifier to the texture characteristic, rather than encoded with the details of the texture itself Regular texture pattern types, such as bricks, marble, woodgrain, satin, velour, etc. are associated with areas of the image, and the encoding of these areas merely contain an identification of the pattern type. Areas of the image that do not contain regular texture pattern types are encoded as conventional raster scanned areas of the image. A decoding device in accordance with this invention processes the conventional raster scanned encoding, then processes the encoding of the textured areas and fills in the details associated with each identified texture pattern type. In a preferred embodiment, the level of detail provided by the decoding device is dependent upon the characteristics of the display device.

As will be evident to one of ordinary skill in the art, although this invention is particularly well suited for conventional surface texturing, any characteristic feature that can be associated with an area can be encoded using the principles presented herein. For ease of presentation and understanding, the terms texture and texture area are used herein to define any characteristic feature or parameter, and the area that contains this characteristic feature or parameter, respectively.

Figure 1:
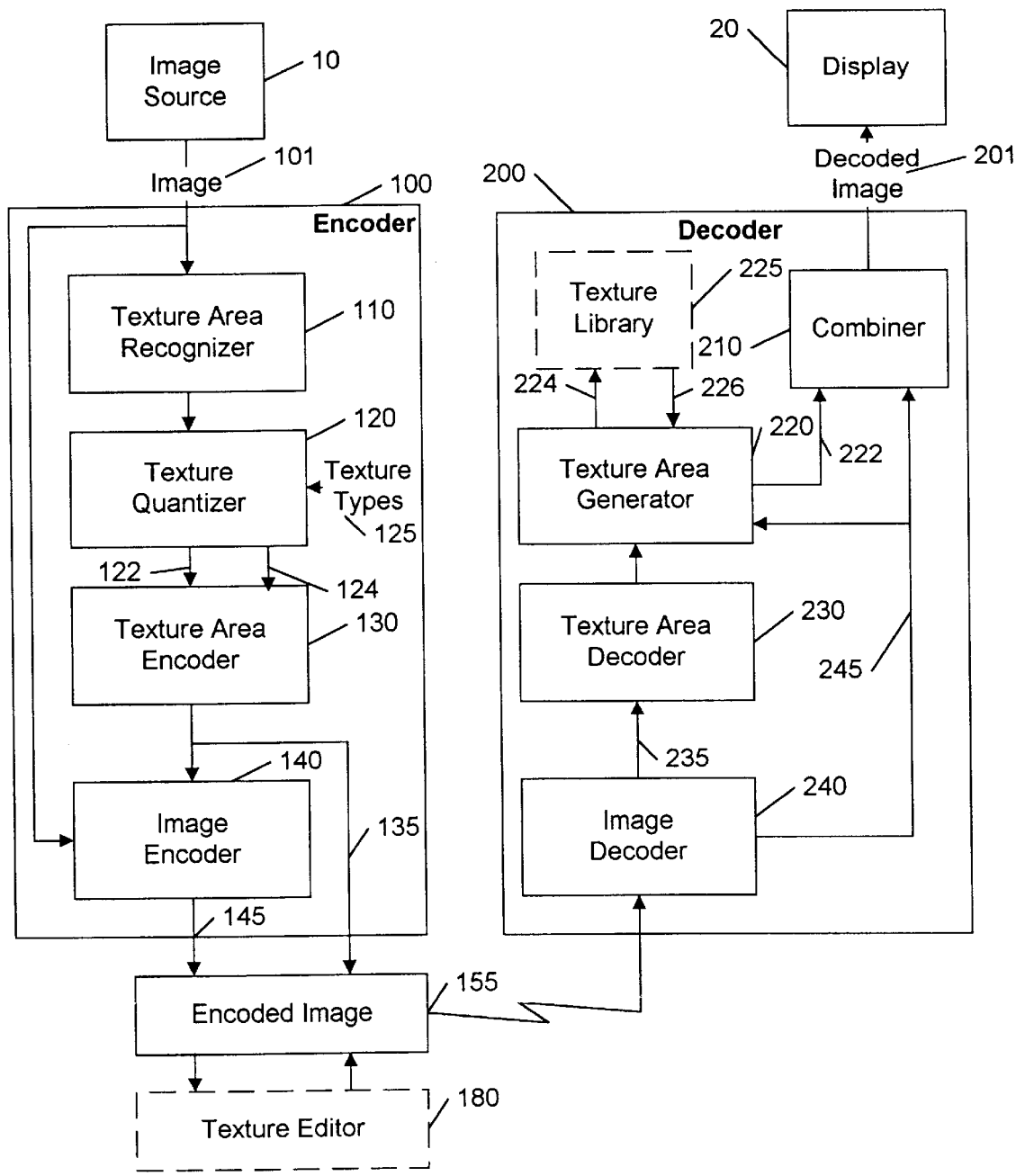
FIG. 1 illustrates example block diagrams of an image encoder and an image decoder in accordance with this invention.

FIG. 1 illustrates example block diagrams of an image encoder 100 and an image decoder 200 in accordance with this invention. The image encoder 100 encodes images 101 from an image source 10 to form encoded images 155. The image decoder 200 decodes the encoded images 155 to produce decoded images 201 for rendering on a display 20. In general, the encoder 100 and decoder 200 encode and decode a sequence of images 101. The following description addresses the encoding and decoding of a single image in accordance with this invention. Techniques are common in the art for encoding a sequence of images as a sequence of changes from a reference image, and the application of these techniques to the principles presented herein will be evident to one of ordinary skill in the art.

The encoder 100 includes a texture area recognizer 110, a texture area quantizer 120, a texture area encoder 130, and an image encoder 140. The texture area encoder 130 and the image encoder 140 each provide an encoded component, 135 and 145 respectively, to the encoded image 155. The texture area recognizer 110 processes the image 101 to identify areas within the image that appear to have a characteristic pattern, as would be common to a textured surface area. Texture recognition techniques are common to one of ordinary skill in the art. For example, textured or repetitive patterns, in general, produce characteristic "signatures" in the frequency domain. Areas within the image that exhibit frequency characteristics that are similar to one of a set of predefined signatures are identified as texture areas. Also, areas that exhibit a distinct characteristic, such as a repetitive pattern, are identified, even if the particular repetitive pattern is not in the set of predefined signatures. In a preferred embodiment, the texture area recognizer 110 is provided a minimum size parameter, such that only characteristic areas that are greater than the minimum size are recognized. This minimum size may be absolute or relative, such as a minimum percentage of the image area. Similarly, abstraction techniques common to the art or pattern recognition may be employed to facilitate the identification of areas having a characteristic pattern. The texture quantizer 120 is shown as a separate block from the texture area recognizer 110, for clarity.

The texture quantizer 120 determines which of several discrete patterns, or texture types 125, is present in each area that the texture area recognizer 110 identifies. In a straightforward implementation of this invention, the texture area recognizer 110 and the texture quantizer 120 are closely coupled; the texture area recognizer 110 uses the texture types 125 to locate only those areas having one of the predetermined texture types 125. In an alternative embodiment, the texture area recognizer 110 recognizes any characteristic pattern in the image 101. The texture quantizer 120 in this alternative embodiment adds the characteristic pattern to the texture types 125 if none of the texture types 125 correspond to the characteristic pattern. The texture quantizer 120 provides two outputs 122, 124. The first output 122 is an identification of each area in the image 101 that can be associated with a particular texture type 125. The other output 124 provides the details of the particular texture type 125, for example, a description of a repetition of rectangles and channels between them, corresponding to a texture type "bricks".

The texture area encoder 130 encodes each area 122 having an associated texture type. In a preferred embodiment, the texture area encoder 130 encodes each area 122 as a polygon having the associated texture type. As noted above, other characteristics or parameters that define the appearance of the area, such as color, shading, translucency, etc. are included in the texture type association to the polygon. The texture area encoder 130 encodes the polygon corresponding to the area as a sequence of coordinates that bound the texture area. The encoding of each texture area polygon and associated texture type forms a component 135 of the overall encoded image 155. If the details 124 of the texture that is defined by the texture type 125 have not yet been communicated to the decoder 200, these details 124 are included in the encoded image 155, via the texture area encoder 130, or the image encoder 140. The details 124 may be any convenient form. If the details are an algorithmic description of how to create the pattern that corresponds to the texture type, the texture area encoder 130 includes this description as part of the component 135 of the encoded image 155. If the details are a sample of the pattern itself, the image encoder 140 encodes the sample using conventional video encoding and compression techniques and includes the encoding as part of the component 145 of the encoded image 155.

Subsequent images need not include the details of textures that have been communicated during the processing of prior images. In this manner, a substantial reduction in the size of an encoded video stream can be achieved, because images from a video stream can be expected to contain repetitions of textured objects. For example, in a movie that includes a setting of an office with woodgrained furniture, areas having a woodgrain texture type would be expected to be within each scene of the office. The first time a piece of woodgrained furniture appears in an image, the details of the woodgrain texture type are encoded, and each subsequent appearance of woodgrained furniture merely require the encoding of a reference to the woodgrain texture type, rather than the details of the woodgrain itself.

The image encoder 140 is a modified conventional video encoder and compressor, such as an MPEG encoder. The modification includes the removal of the details of the texture areas 122 that are encoded in component 135 from the image 101 before the image 101 is encoded. The texture areas 122 are encoded as an area of null characteristics, such as a monochrome area encoding. As discussed in the background to the invention, a monochrome area encoding can be efficiently compressed using conventional compression techniques. Thus, the conventional video encoding of the textured areas can be reduced substantially by replacing the details of the texture in the area with an efficiently compressible characteristic. This reduced sized video encoding forms the second component 145 of the encoded image 155. If the image is such that the entire image is composed of texture areas, there is no second component 145 to the encoded image 155. That is, an image that can be entirely encoded as textured areas will be so encoded; conversely, an image that has no textured areas will be encoded using conventional video encoding and compression techniques.

Thus, in accordance with this invention, areas having repetitive or otherwise characterizable features are encoded efficiently as textured areas, and the remaining, non-repetitive or uncharacterizable areas are encoded using conventional video encoding techniques, such as MPEG. In this manner, the efficiencies of graphics image processing and video image processing can be employed to minimize the resultant size of the encoded image, thereby allowing it to be transmitted at a slower speed, or with less bandwidth.

Illustrated in FIG. 1 is an optional texture editor 180. The texture editor 180 facilitates the modification of the characteristics or parameters associated with each texture area. Through the use of the texture editor 180, a user may replace one texture type with another, or change the parameters associated with the texture type. For example, a desk within an image may have an associate texture type and characteristic corresponding to an oak woodgrain. Via the texture editor 180, a user may modify the associated characteristics so as to correspond to a walnut woodgrain. Similarly, an encoding of a carpeted floor may be modified so as to effect the rendering of a marble tiled floor when the encoding 155 is decoded by the decoder 200.

The decoder 200 decodes the encoded image 155 to produce a decoded image 201, corresponding to the original image 101. The decoder 200 includes an image decoder 240, a texture area decoder 230, a texture area generator 220, and a combiner 210. The image decoder 240 decodes the component of the encoded image 155 corresponding to the component 145 produced by the image encoder 140. The decoded output 245 of the image decoder 240 is the original image 101 less the details of the textured areas 122. That is, the decoded output 245 provides a context within which the details of the textured areas are rendered.

The texture area decoder 230 processes the remaining component 235 of the encoded image 155 that corresponds to the component 135 produced by the texture area encoder 130. The texture area decoder 230 decodes the encoding 155 of the texture areas of the image 101 and provides the appropriate parameters to the texture area generator 220 to allow the texture area generator 220 to generate the details 222 associated with each texture area. That is, the texture area decoder 230 provides the location of the texture area and the texture type that is associated with the texture area to the texture area generator 220. If the details 124 of the texture type are contained in the remaining component 235, the texture area decoder 230 provides this detail 124 to the texture area generator 220. Alternatively, if the details 124 of the texture are encoded in the component corresponding to component 145, the image decoder 240 provides the details 124 to the texture area generator 220, via 245.

In accordance with another aspect of this invention, the decoder 200 includes a texture library 225. The texture library 225 provides the details 226 of predefined texture types. The texture area generator 220 provides a texture type identifier 224 to the texture library 225, which in turn communicates the details 226 that are associated with the texture type identifier 224. The texture type identifier 224 includes a reference to a particular texture type, such as marble, wood, bricks, and the like, as well as other parameters, such as a scaling factor, that may be required for the texture library 225 to determine the details 226 needed to render the identified texture. The texture library 225 may be static or dynamic. In a static texture library, a predetermined number of texture types are defined, and the characteristics of each texture type is stored in the library 225. A dynamic texture library allows for the addition of texture types by adding the details 124 of the texture type that are included in the encoded image 155, as discussed above. These details 124 are communicated to the texture library 225 by the texture area generator 220, via 224, for each as yet undefined texture type. In a preferred embodiment, the texture library 225 is customized for the display 20 that is being used. A texture library 225 customized for a low resolution display, for example, will provide low resolution details for the texture type to avoid distortions caused by aliasing. The lower level of detail may also require less processing or storage resources, thereby reducing the cost and complexity of low resolution devices. The texture library 225 also allows for a size reduction in the encoded image 155. If a standard is established among encoders 100 and decoders 200 that includes the definition of common texture types, such as woodgrain, bricks, marble, etc., and each decoder 200 contains a means of generating the details of such types, such as a texture library 225, the encoder 100 need not include the details of these texture types in the encoded image 155.

As discussed above, the details 124 associated with a texture type may include an algorithmic description of how to create the pattern that corresponds to the texture type. Techniques for algorithmically creating an image having texture are common in the art. For example, fractals are commonly used to create the appearance of leaves on a tree, sand on a beach, or the varying shades of blue in a sky scene. Random "noise" patterns are also commonly used to generate textures, such as the texture of flesh, hide, and many cloths and fiber products. The details 124 may be parameters for predefined functions, such as fractal and noise generators, in the texture generator 220, or any other convenient form for effecting the rendering, including a combination of algorithmic parameters and discrete samples of the characteristic texture. For example, the details 124 may include a sample image of a brick with mortar, and parameters relating the replication and sizing of the sample relative to the size of the texture area.

The texture generator 220 fills each texture area with the details of the texture type that is associate with each texture area. The text "Texture and Modeling: A Procedural Approach" by Ebert, D; Musgrave, K.; Peachy, P.; Perlin, K.; and Worley, S., 1994, AP Professional, (ISBN 0-12-228760-6), describes the modeling and rendering of texture areas and is incorporated by reference herein. In a preferred embodiment, the texture generator 220 is customized to the display 20, and the parameters affecting the rendering of the decoded image 201 on the display 20. For example, if the decoded image 201 is to be rendered as a picture-in-picture (PIP) image in a small area of the display 20, the texture generator 220 fills each texture area with minimal, if any, detail. Also in a preferred embodiment, the texture generator 220 renders the details of the texture area in dependence upon the relative scale of the area being rendered. For example, the woodgrained texture of a desk is rendered differently depending upon the relative distance of the desk from the viewing point. The width of the individual grains of the wood, for example, are rendered smaller as the distance to the desk increases. The rendering parameters, such as the relative scaling associated with each texture area, are communicated to the decoder 200 via the component 135 of the encoded image 155, as discussed above with regard to the texture area encoder 130 and the contents of the optional texture library 225. The texture generator 220 includes the aforementioned function generators, such as random noise generators and fractal generators, for creating the rendering detail of each texture area, using the parameters contained in the details 226. The output 222 of the texture generator 220 is a detailed image of each of the texture areas and their location in the original image 101. The combiner 210 combines the component 245 of the image that has null characteristics associated with each texture area with the component 222 of the image that has the details of each texture area. The decoded image 201 produced by the combiner 210 contains both the details of the texture areas as well as the details of the non-texture areas, and thus will substantially correspond to the original image 101.

Figure 2:
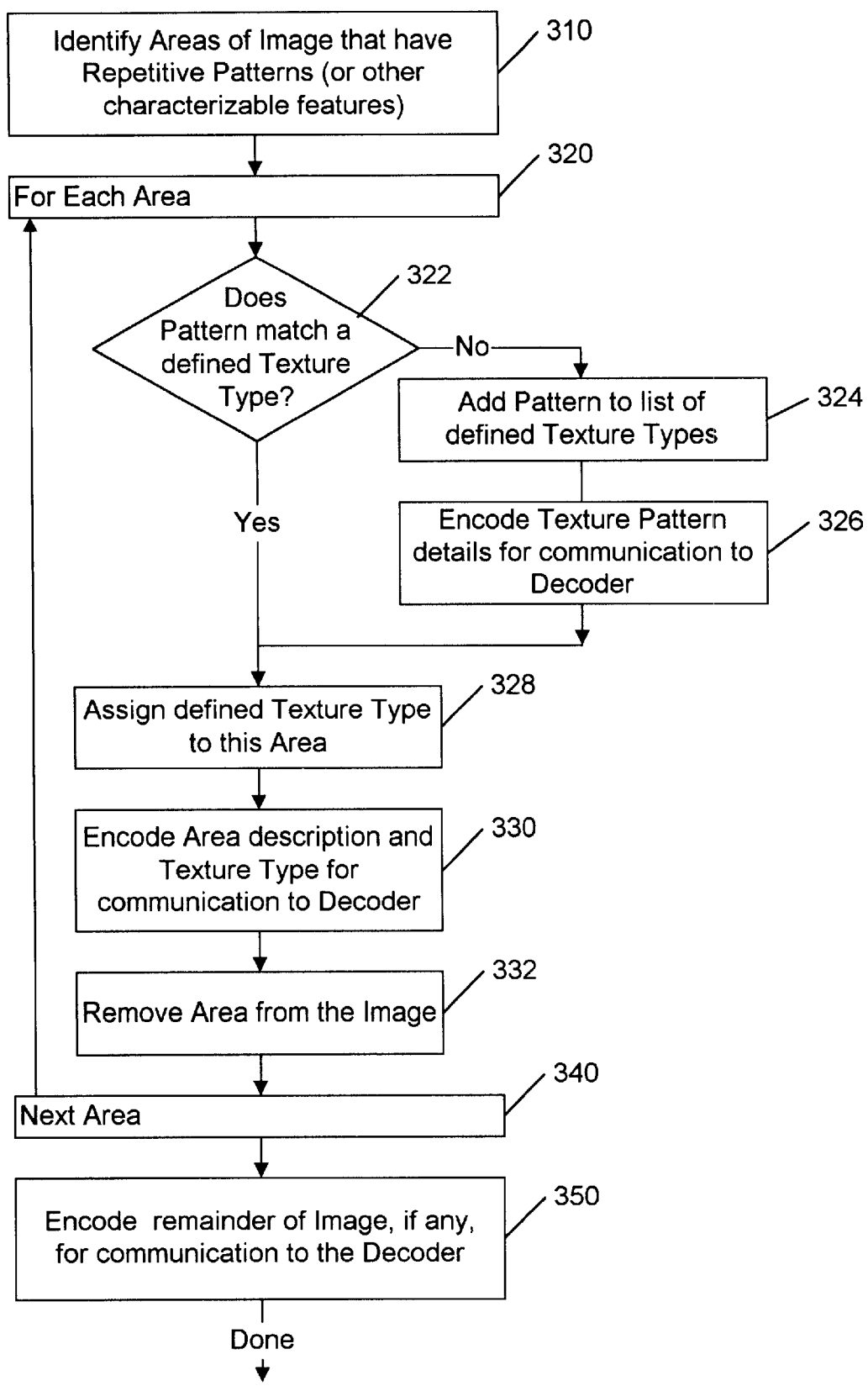
FIG. 2 illustrates an example flow chart for encoding an image in accordance with this invention.

FIG. 2 illustrates a flowchart for encoding an image in accordance with this invention. At 310, areas of the image containing characteristic patterns are identified. Each area is processed in the loop 320–340. At 322, the characteristic pattern of the area is compared with the currently determined texture types. If the characteristic pattern matches one of the texture types, the texture type is assigned to this area, at 328. If the characteristic pattern is not recognized as one of the currently determined texture types, the pattern is added to the list of determined texture types, at 324. The details of each newly added texture type is encoded for communication to the decoder at 326. If a standard exists among encoders 100 and decoders 200 for predefined texture types, these predefined texture types will be included in the list of currently determined texture types upon initialization, and thus the details of these predefined texture types will not be encoded for communication to the decoder at 326. Initializing the list of currently determined texture types to a null list, on the other hand, will provide an encoding of the details of each texture area for communication to the decoder at 326. As noted above, once the details of a new texture type is communicated to the decoder, subsequent areas of this type, whether in the same image or subsequent images, need only be referenced to the texture type.

The description of the texture area is encoded, at 330, using, for example, coordinates of a polygon that bounds the texture area. Alternative techniques for defining and efficiently encoding the bounds of an area are known in the art; for example, if the texture area is primarily curved, the coordinates of spline segments that form each curve can be encoded. Associated with the encoded description of each texture area is the texture type corresponding to the pattern or characteristics contained within the texture area. As each area is encoded, the image, or copy of the image, is modified so as to remove the details associated with the area from the image, at 332. In a preferred embodiment, each texture area is filled with a null characteristic that corresponds to a solid black color. Each area is similarly processed, via the loop 320–340.

If the remaining image contains any area that has not been encoded as a texture area, it is encoded using conventional video encoding techniques, at 350. In a preferred embodiment, a bounding rectangle is determined that includes all of the areas that have not been encoded, and the video encoding is applied to the area within the bounding rectangle. Because each textured area is filled with a null characteristic, the encoding of the remaining image, if any, can be expected to produce a very efficient encoding using encoding and compression techniques common in the art.

Figure 3:
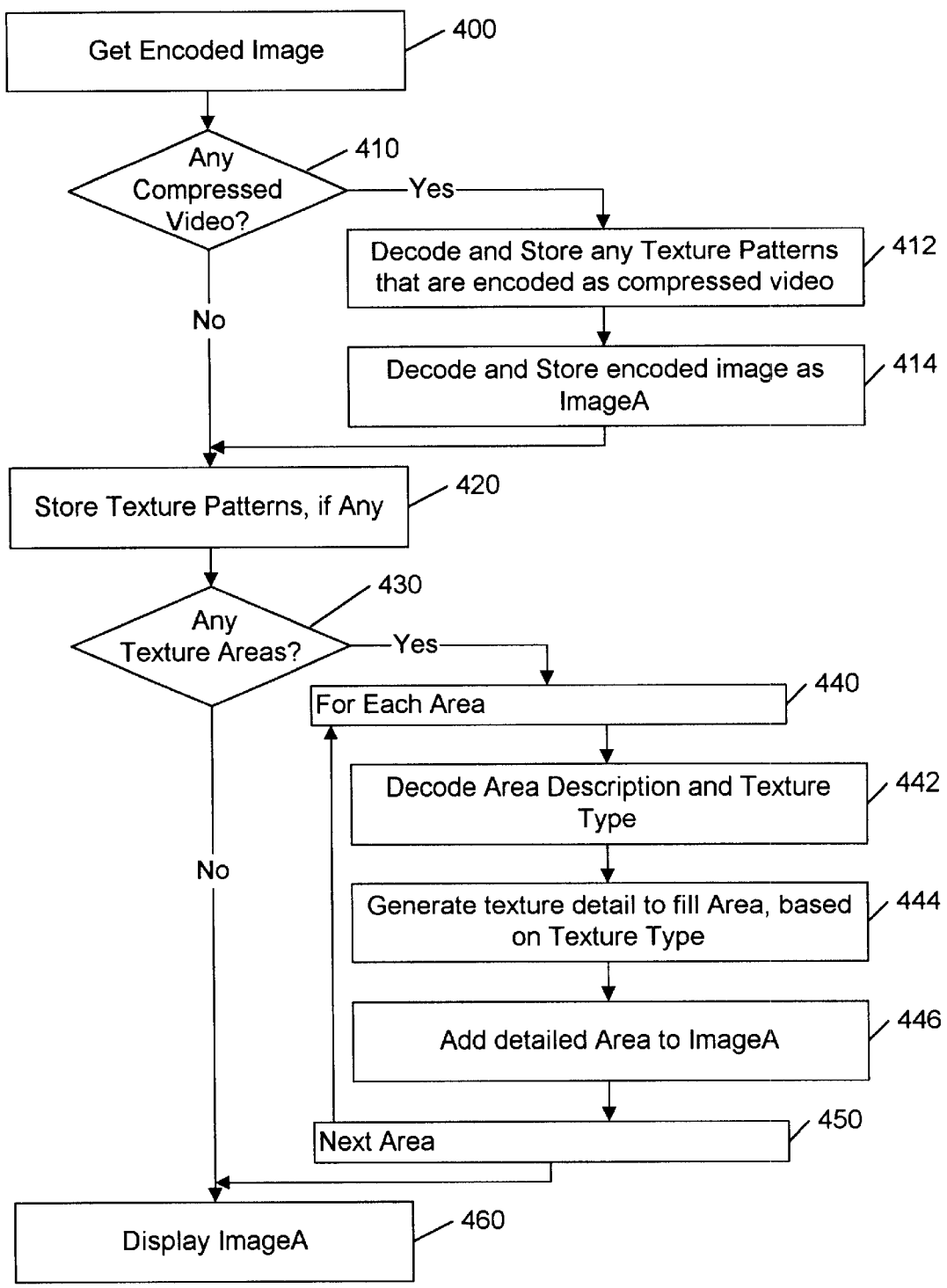
FIG. 3 illustrates an example flow chart for decoding an image in accordance with this invention.

FIG. 3 illustrates an example flow chart for decoding an encoded image in accordance with this invention. The encoded image is obtained at 400. As discussed above, the encoded image may contain encoded descriptions 135 of texture areas or texture patterns, or compressed raster scanned video data 145 corresponding to details of particular texture types or the areas of the image that remain after removing each textured area. If the encoded image contains compressed video data, at 410, the texture patterns, if any, are decoded and stored, at 412, and the areas of the image that remain after removing each textured area is decoded and stored, at 414. If a texture pattern is expressly contained in the encoded image, such as an algorithmic description of the pattern, it is stored, at 420.

If, at 430, there are any texture areas within the encoded image, they are processed via the loop 440–450. The description of each area and the texture type associated with each area are decoded at 442. An area filled with the texturing details associated with the corresponding texture type is generated, at 444, and added to the stored image, ImageA. The texturing details are determined by the associated texture type and the patterns associated with the texture type, which may be stored in a predefined library, or stored via the aforementioned steps 412 and 420. As discussed above, the details may be dependent upon the characteristics of the display, and upon the parameters associated with the texture area. The details of the texture that are communicated to, or predefined in, the decoder may merely be scaled and replicated, or, the details of the texture may be computed via an algorithmic description of the area, suitably scaled to the parameters of the rendered area. The stored image ImageA is the image thus far created via the decoding of any compressed video components or texture area components of the encoded image. After each texture area is processed, via the loop 440–450, the stored image ImageA substantially contains the original image with corresponding details of each textured area. The stored image ImageA is rendered for display, at 460.

The foregoing merely illustrates the principles of the invention. It will thus be appreciated that those skilled in the art will be able to devise various arrangements which, although not explicitly described or shown herein, embody the principles of the invention and are thus within its spirit and scope. For example, each textured area in the image has been presented thus far as a discrete, non-overlapping, area of the image. As is common in the art, images can be composed of overlapping areas, wherein each area has a z-axis (visibility) parameter that determines which area is above other areas. Using this technique, for example, the background of an image can be encoded as a texture area, and other areas in the image as texture areas atop this background texture area. Also, the details of the image that are not encoded as texture areas can be replaced by such a background encoding, thereby providing an efficient encoding of the image for those applications that do not require high resolution. These and other particular image and graphics encoding techniques are evident to one of ordinary skill in the art, and are within the spirit and scope of this invention.

I claim:

1. A video encoder for encoding a video image from a video source, the encoder comprising:

a texture area recognizer, operably coupled to the video source, that determines at least one texture area within the video image, a texture quantizer, operably coupled to the texture area recognizer, that determines at least one texture type associated the at least one texture area within the video image, a texture area encoder, operably coupled to the texture quantizer, that encodes the at least one texture area within the video image based upon the at least one texture type, an image encoder, operably coupled to the video source and to the texture area encoder, that encodes the video image based on the encoding of the at least one texture area within the video image.

2. The video encoder of claim 1, wherein the texture area encoder encodes at least one of: the texture type, a location, a boundary, and a color associated with the at least one texture area.

3. The video encoder of claim 1, wherein the image encoder encodes a predefined null characteristic corresponding to the at least one texture area.

4. The video encoder of claim 3, wherein the texture area encoder encodes at least one of: the texture type, a location, a boundary, and a color associated with the at least one texture area.

5. The video encoder of claim 1, wherein the texture quantizer determines the at least one texture type based on a predefined plurality of texture types.

6. The video encoder of claim 1, also including a texture editor that facilitates a modification of characteristics associated with the at least one texture area within the video image.

7. A video decoder, comprising:

a texture area decoder that processes an encoding of a texture area to determine a texture type and a location associated with the texture area, a texture area generator, operably coupled to the texture area decoder, that determines texture characteristics associated with the texture area based on the texture type, an image decoder that processes an encoding of an image to determine rendering characteristics associated with the image, a combiner, operably coupled to the image decoder and the texture area generator, that produces a video image suitable for rendering on a display based upon the rendering characteristics associated with the image and the texture characteristics associated with the texture area.

8. The video decoder of claim 7, further including:

a texture library, operably coupled to the texture area generator, that provides texture patterns to facilitate the determination of the texture characteristics associated with the texture area.

9. The video decoder of claim 7, wherein the texture area generator determines the texture characteristics associated with the texture area based on at least one of a plurality of display characteristics associated with the display.

10. The video decoder of claim 7, wherein the texture area generator includes a function generator that facilitates determination of the texture characteristics based on a parameter associated with the texture type.

11. The video decoder of claim 10, wherein the function generation includes at least one of: a fractal generator, a random noise generator, and a repetition generator.

12. The video decoder of claim 8, wherein the texture library includes a texture scaler that scales the texture patterns to facilitate the determination of the texture characteristics associated with the texture area.

* * * * *